United States Patent [19]

Maples

[11] 4,290,374
[45] Sep. 22, 1981

[54] HAND-HELD AND OPERATED SEEDER APPARATUS

[76] Inventor: Billy G. Maples, 65 Dale Rd., Middletown, N.J. 07748

[21] Appl. No.: 56,988

[22] Filed: Jul. 12, 1979

[51] Int. Cl.³ .......................... A01C 5/02; A01C 7/02; A01C 15/02
[52] U.S. Cl. ...................................... 111/92; 111/7.2; 111/95; 222/191; 222/196.1; 222/457.5; 239/652; 239/689
[58] Field of Search .................. 111/7.1–7.3, 111/10, 11, 82, 92, 95, 96, 99; 239/652, 659, 689; 222/161, 175, 191, 196.1, 457.5, 480, 565

[56] References Cited

U.S. PATENT DOCUMENTS

| 133,709 | 12/1872 | Jones | 111/92 |
| 423,645 | 3/1890 | Walter | 111/1 |
| 659,688 | 10/1900 | McPherson | 239/652 |
| 1,314,546 | 9/1919 | Stratton | 111/95 |
| 1,911,692 | 5/1933 | Jalandoni | 111/95 |
| 1,965,177 | 7/1934 | Finkl | 111/92 UX |
| 2,189,454 | 2/1940 | Thomas | 222/457.5 X |
| 2,221,113 | 11/1940 | Schmitt | 239/652 |
| 2,248,176 | 7/1941 | Johnson | 111/92 |
| 2,600,131 | 6/1952 | Schwarm et al. | 111/92 X |
| 2,747,528 | 5/1956 | Hunkins | 111/92 |
| 2,767,820 | 10/1956 | Ramsey | 111/92 X |
| 2,987,018 | 6/1961 | Vath | 111/92 X |
| 3,799,081 | 3/1974 | Wilson | 111/96 X |
| 4,011,612 | 3/1977 | Atkinson | 111/92 X |

FOREIGN PATENT DOCUMENTS

| 66151 | 6/1892 | Fed. Rep. of Germany | 222/457.5 |
| 317198 | 8/1929 | United Kingdom | 222/553 |
| 478743 | 1/1938 | United Kingdom | 239/652 |
| 516665 | 1/1940 | United Kingdom | 222/553 |

Primary Examiner—Steven A. Bratlie
Attorney, Agent, or Firm—Patrick J. Pinto

[57] ABSTRACT

A hand-held and operated seeder apparatus is provided which is capable of carrying and spreading seed and the like to selected lawn areas. This operation is accomplished by securing the lower end of a storage handle to a cup member. When the apparatus is moved up and down, seed in the handle flows from the handle to the cup and the seed is then jostled to and over the top of the cup. The seed falls onto localized areas of ground.

6 Claims, 9 Drawing Figures

HAND-HELD AND OPERATED SEEDER APPARATUS

BACKGROUND OF THE INVENTION

1. Field of the Invention

With reference to the classification of art as established in and by the United States Patent and Trademark Office the present invention is believed to be found in the Class entitled, "Planting" (Class 111) and in particular in the subclass entitled, "dibbling manually operated implement" (subclass 92).

2. Description of the Prior Art

The disclosed hand-held and operated lawn seeder for cultivating and seeding small areas of lawn provides means for an amateur or professional grounds-keeper to carry seed and precisely cultivate small areas of lawn. A careful pre-Ex search disclosed several patents showing hand operated lawn implements but not the simple tool provided in the present invention.

Among the patents found and presumed pertinent to this invention are U.S. Pat. No. 133,709 as issued to Jones on Dec. 10, 1872; U.S. Pat. No. 423,645 as issued to Walter on Mar. 18, 1890; U.S. Pat. No. 1,965,177 as issued to Finkl on July 3, 1944; U.S. Pat. No. 2,600,131 as issued to Schwarm, et al., on June 10, 1952; U.S. Pat. No. 2,767,820 as issued to Ramsey on Oct. 23, 1956; U.S. Pat. No. 2,747,528 as issued to Hunkins on May 29, 1956; U.S. Pat. No. 2,987,018 as issued to Vath on June 6, 1961 and U.S. Pat. No. 4,011,612 as issued to Atkinson on Mar. 15, 1977.

In these and other concepts the apparatus is complex and/or incomplete in performing the operation of cultivating and seeding.

Cultivating and/or seeding systems as known require a series of steps to operate the hand tools and at the same time restrict the view of the gardener or grounds-keeper during the application of the seed. Insofar as is known, the simple tool and easy operation as disclosed in the present invention is not suggested or shown.

This invention provides a simple tool for the cultivation and/or seeding of small areas of lawn without the use of valve apparatus or additional operations by the grounds-keeper or gardener.

SUMMARY OF THE INVENTION

This invention may be summarized at least in part with reference to its objects.

It is an object of this invention to provide, and it does provide, a hand-held and operated lawn seeder for seeding and/or cultivation of small areas of lawn by the operator while standing substantially erect.

It is a further object of this invention to provide, and it does provide, a hand-held and operated seeder which requires a simple one-hand motion to perform seeding and/or cultivation of small areas of lawn.

It is still another object of this invention to provide, and it does provide, a hand-held and operated seeder to which no moving parts are required in the process or cultivation and/or seeding of small areas of lawn.

It is still a further object of this invention to provide, and it does provide, a hand operated seeder in which the operator is able to monitor the amount of seed to be applied to the damaged or bare area of the lawn that is to be reseeded.

In brief, a hand-held and operated seeder apparatus to be herein more fully described includes a tubular handle providing a seed storage means. This handle is secured to a cup member having an open top, sidewalls, and a closed lower base. A seed escapement means is formed in a lower portion of the handle located inside the sidewall portion of the cup. A preferred embodiment includes an additionally formed downwardly extending sidewall portion of the cup with the downward sidewall portion having tooth-like projections provided therein and thereon.

BRIEF DESCRIPTION OF THE DRAWINGS

In the following description and in the claims various details are identified by specific names for convenience. These names are intended to be generic in their application. Corresponding reference characters refer to like members in the nine figures of drawings.

The drawings accompanying and forming part of this specification disclose details of construction for the purpose of explanation but structural details may be modified without departure from the concept and principles of the invention and the invention may be incorporated in other structural forms than shown.

DESCRIPTION OF THE PREFERRED EMBODIMENT

Figure 1:
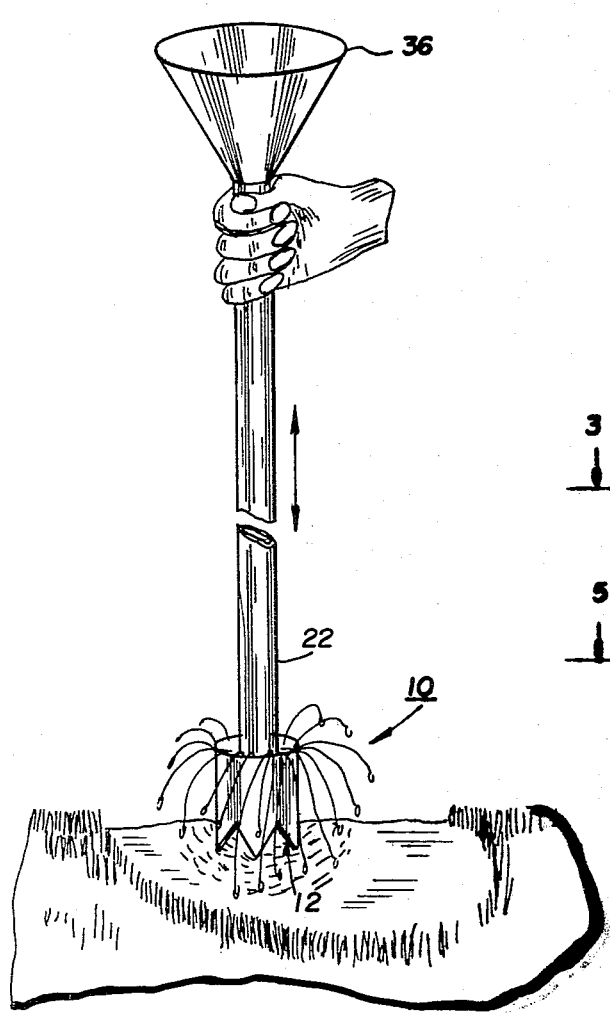
FIG. 1 represents a pictorial side view of the hand-held and operated lawn seeder of this invention as it is used by a grounds-keeper or gardener.
Figure 2:
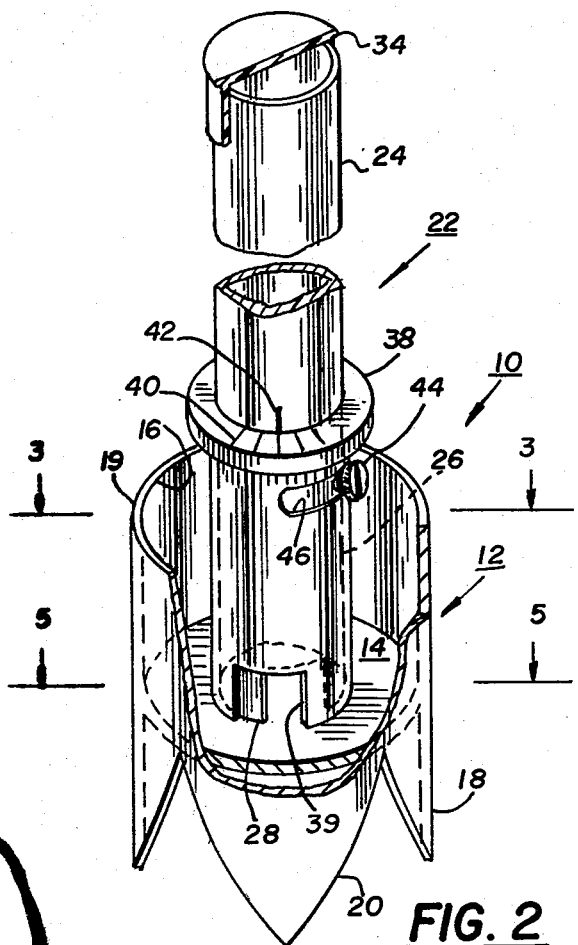
FIG. 2 represents an enlarged, partly sectional, isometric view of the seeder and particularly showing the lower portion of the hand-held and operated lawn seeder of this invention with a portion of the handle deleted.
Figure 3:
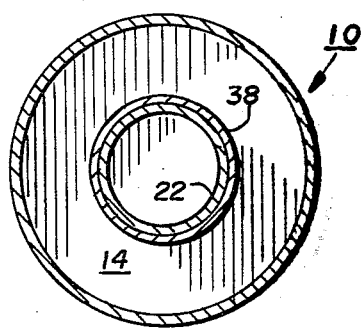
FIG. 3 represents a top view of the upper cup portion of the seeder shown in FIG. 2, this view taken on the line 3—3 thereof and looking in the direction of the arrows.
Figure 4:
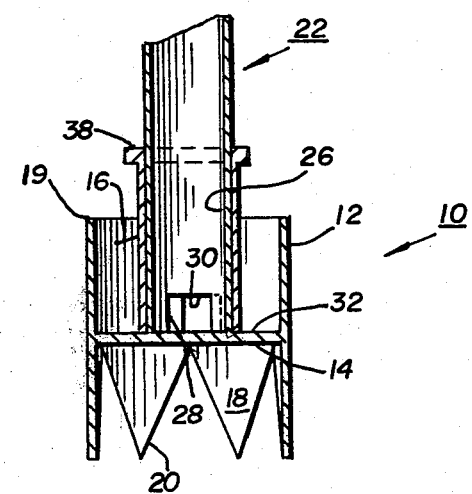
FIG. 4 represents a sectional side view in a slightly reduced scale and showing an alternate means for retaining the seed flow discharge control means.
Figure 5:
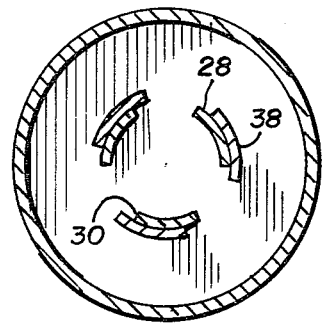
FIG. 5 represents a top view of the upper cup portion of the seeder shown in FIG. 2, this view taken on the line 5—5 thereof and looking in the direction of the arrows.

Referring to the drawings and in particular to FIGS. 1, 2, 3, 4 and 5, a cup member generally indicated as 10 has substantially vertical sidewalls 12 and a closed base generally indicated as 14. This base is disposed mid-length of the sidewalls 12 to form an upper portion 16 and downwardly extending sidewall portions 18 of the cup member 10. This upper portion 16 may be finished as shown with a smooth lip 19 or alternately may be formed with a beaded edge. Sidewall portion 18 of the sidewall member 12 is depicted as serrated thereby forming tooth-like projections 20. An elongated tubular handle, generally indicated as 22, has an upper portion 24 and a lower end 26. This lower end 26 as a preferred arrangement has evenly spaced castellated projections 28 providing a seed escapement 30. The lower end 26 is secured by welding or the like to a top surface 32 of the base member 14. The upper portion 16 of the cup is parallel to the tubular handle. This tubular handle is depicted with a simple straight end 34 or alternately may be formed with a funnel mouth 36 as shown in FIG. 1. A sleeve member generally indicated as 38 has a castellated end 39. These castellations are matched with the castellations of the tubular handle 22. The sleeve member 38, rotatably mounted on the tubular handle 22, forms a seed escapement metering device. Graduations 40 on the sleeve 38 cooperate with reference point 42 on the tubular handle 22 to establish the degree of closure. In particular, FIG. 2 shows a locking screw 44 and a slot 46 which cooperate to form a locking means for a seed escapement metering device.

Figure 6:
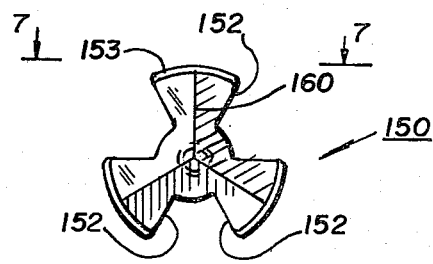
FIG. 6 represents a plan view of a dividing insert as installed in the alternate embodiment shown in FIG. 7.
Figure 7:
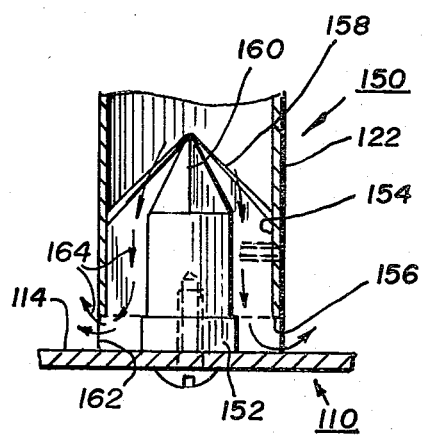
FIG. 7 represents a side view partly in section and partly diagrammatic and showing yet another seed escapement or metering control means taken along line 7—7 of FIG. 6.

Alternate Embodiment of FIGS. 6 and 7

Referring next to FIGS. 6 and 7, a cup member 110 much like the cup 10 depicted in FIG. 2 is shown with a dividing insert generally indicated as 150. This insert has a plurality of radially disposed ears 152. A flange portion 153 of the dividing insert 150 is substantially the same diameter as that of the outside diameter of tubular handle 122. A reduced diameter 154 provides a step 156 as a seating means for the tubular handle 122 which is secured to the reduced diameter 154 by means of a press fit, screws or rivets. Adjacent to the reduced diameter 154 is a tapered portion 158 resulting in ears 152 peaking to chisel edges 160. An escapement means 162 is formed by the handle 122 and the dividing insert 150 and is determined by the number and spacing of the ears 152. Arrows 164 indicate the general path of the seed to and thru the escapement means 162. It is to be noted that the drawings and FIGS. 6 and 7 show the dividing insert with three segments but it is, of course, recognized that as few as two segments could be provided or more than three segments could also be employed.

Figure 8:
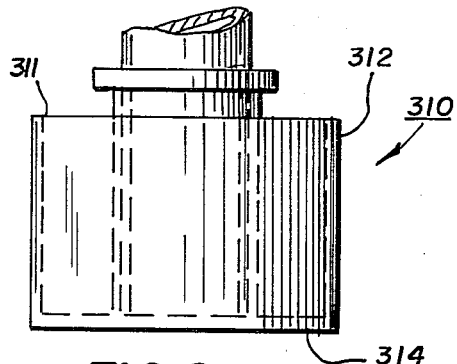
FIG. 8 represents a side view of a cup construction showing an alternate embodiment with a flat bottom.

Alternate Embodiment of FIG. 8

Referring next to the alternate embodiment as shown in FIG. 8, there is shown a cup 310 which is very sililar to the cup 10 as depicted in FIG. 2. This alternate cup 310 has an open top 311 and sidewalls 312 which mate with and continue into a closed flat bottom surface 314. This bottom surface provides a tamping surface which may be used after the seed has been scattered on the prepared surface.

Figure 9:
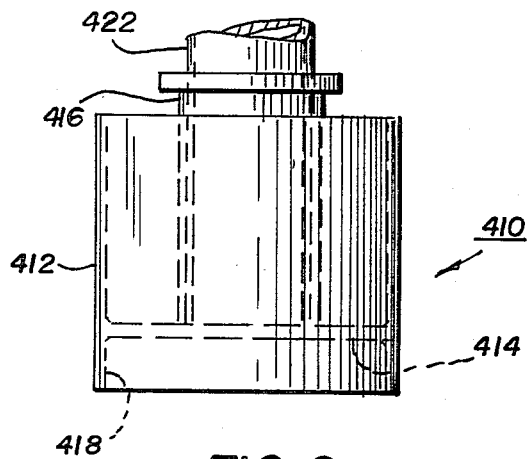
FIG. 9 represents a side view of yet another embodiment of a cup construction with a downwardly extending rim.

Alternate Embodiment of FIG. 9

Referring next and finally to the alternate embodiment as shown in FIG. 9, there is shown a cup 410 which is very similar to the cup 10 as depicted in FIG. 2 and also in FIG. 8, as cup 310. This alternate construction of a cup has sidewalls 412 and a closing base 414 which is used to secure the cup to handle 422. An upper and inner collar portion 416 is provided for ready mounting of the cup onto the handle 422. Any of the metering devices shown and described in the above embodiments may be employed. The cup 410 has a downwardly extended skirt 418 and is finished with a smooth or rolled lip. The extent of downward extension of this sidewall is merely a matter of choice.

Use and Operation

For use of the hand-held and operated seeder apparatus, it is assumed that the tool is assembled as shown and depicted in FIGS. 5, 6, 7, 8 and 9. Granular material such as seed or fertilizer is placed in the handle 22 using a funnel or other suitable means to control spillage. The handle 22 forms a storage compartment for the material being distributed. Preparation of the soil may be accomplished by moving the apparatus up and down causing penetration of the soil by the tooth-like projections 20 of FIG. 2. A slight and repeated motion will cause only soil penetration and/or cultivation. A more vigorous motion will cause seed in the handle to flow through the escapement means and into the cup from which the seed is jostled to and over the open top of the cup 10, distributing the seed onto the ground. The amount of seed may be seen by the operator since nothing inhibits his view. Various density of seed distribution can be controlled by the operator. More or less seed can be distributed in a small area depending on his desire to increase or decrease the amount of seed applied. Seed will also fall into the perforations made in the ground by the tooth-like projections of the seeder, thereby giving some protection to the seed during germination. A seed escapement metering means 38 may have a friction fit or be clamped in place by suitable means. This metering means may be reduced or opened to accommodate various sizes of seed or granules. The metering means can be completely closed to shut off the supply of seed during the cultivation process if a more vigorous motion is required to penetrate the soil. The metering control means may have graduations printed or engraved on it so that predetermined metering control can be established and maintained.

It may be noted that the device as described may be made as a steel weldment or molded from a high strength plastic such as ABS or Lexan. A cap or plug 34 may be provided for the upper portion of the handle 22 to close the upper portion of handle 22. The funnel 36 may also be used and the cap or plug 34 may be inserted into the upper end of the handle 22 to enclose the seed in the tubular inner portion of the handle. The alternate embodiments shown and described provide means for equipping a hand-held and operated seeder with a particular means for distributing a desired quantity of seed on a selected ground area. The cup can provide cultivation means as in FIG. 2 or a tamping ability as in FIG. 8 or a downwardly extended skirt as in FIG. 9. The cup construction is a matter of selection. The wall of the handle and the other members such as the cup, bottom and metering components are usually made of metal with comparatively thin wall sections. These several members are depicted with their thickness in excess of that usually used, but this wall thickness is shown for the sake of illustration and is not necessarily a representation of the actual wall thickness selected.

Terms such as "up", "down", "bottom", "top", "front", "back", "in", "out" and the like are applicable to the embodiments shown and described in conjunction with the drawings. These terms are merely for the purposes of description and do not necessarily apply to the position in which the hand-held and operated seeder apparatus may be constructed or used.

While a particular embodiment of this tool and alternate embodiment has been shown and described it is to be understood the invention is not limited thereto since modifications may be made within the scope of accompanying claims and protection is sought to the broadest extent the prior art allows.

What is claimed is:

1. A hand held and operated seeder apparatus particularly adapted for local application of seed and the like to selected lawn areas, said seeder apparatus including:

(a) an elongated rigid tubular handle, having a predetermined diameter and providing a seed storage means, said rigid tubular handle having an upper end and a lower end; the upper end of the rigid handle adapted for grasping in and by a hand of a user for manipulation thereof, at said lower end of the rigid handle and carried thereby is a seed applicator;

(b) said seed applicator having a circular cup member with an open top, imperforate sidewalls secured to a substantially flat base portion, said substantially flat base portion larger than said predetermined diameter of said rigid handle and with said imperforate sidewalls secured to said substantially flat base portion so as to extend upwardly and downwardly from said substantially flat base portion, said imperforate sidewalls of said circular cup member in said secured condition being substantially coaxially aligned with the axis of said rigid tubular handle, said downwardly extending sidewall of said circular cup member having a plurality of tooth-like projections adapted to enter and cultivate the ground when and while the seeder apparatus is manipulated toward and into the ground, and (c) a seed escapement means formed in said lower end of the rigid handle and adapted to deliver to the inside of said circular cup member and be retained by said imperforate sidewalls thereof seeds in and from said rigid tubular handle, said seed escapement means including a castellated end formation in and at said lower end of the rigid tubular handle, with a rotatable sleeve carried by said lower end of the rigid tubular handle so that as said rotatable sleeve is selectively positioned the seed from said rigid tubular handle escapes into said circular cup member in a metered amount corresponding to the desired quantity of seed to be distributed and when the seeder apparatus is moved up and down seed in said rigid tubular handle flows through said seed escapement means and into said circular cup member from which the seed is jostled to and over said open top of the imperforate sidewall of the circular cup member so as to fall onto and into localized areas of the ground.

2. A hand held and operated seeder apparatus as in claim 1 in which the rotatable sleeve is secured to a graduation means providing indicia which is read and used to provide a desired metering of the escapement of the seeds.

3. A hand held and operated seeder apparatus as in claim 2 in which the rotatable sleeve is also provided with a selectively lockable means.

4. A hand held and operated seeder apparatus as in claim 3 in which the selectively lockable means is a thumb screw provided and mounted in a companion threaded portion, said thumb screw and threaded portion when tightened bringing said adjacent rotatable sleeve and rigid tubular handle portions into frictional retention against unwanted movement.

5. A hand held and operated seeder apparatus as in claim 1 in which the the escapement means also includes a dividing insert secured within and to the rigid tubular handle and to the flat base portion of the circular cup member.

6. A hand held and operated seeder apparatus as in claim 1 in which the upper end of the rigid handle is provided with a removable closure means.

* * * * *